United States Patent [19]

Russell et al.

[11] 4,133,600
[45] Jan. 9, 1979

[54] METHOD OF MANUFACTURING AND UTILIZING HOLOGRAPHIC LENS MEANS

[75] Inventors: James T. Russell; Bernard P. Hildebrand, both of Richland, Wash.

[73] Assignee: Eli S. Jacobs, New York, N.Y.

[21] Appl. No.: 728,872

[22] Filed: Oct. 1, 1976

[51] Int. Cl.² ............................................. G02B 27/17
[52] U.S. Cl. .................... 350/3.72; 178/15; 346/108; 350/3.83; 350/6.3; 350/189
[58] Field of Search ............ 350/3.5, 6, 7, 189; 178/15; 346/108

[56] References Cited

U.S. PATENT DOCUMENTS

| 2,759,393 | 8/1956 | McLeod | 350/189 X |
|---|---|---|---|
| 3,501,586 | 3/1970 | Russell | 178/15 X |
| 3,580,655 | 5/1971 | Leith et al. | 350/3.5 |
| 3,807,829 | 4/1974 | Close | 350/3.5 |
| 3,940,204 | 2/1976 | Withrington | 350/3.5 |

OTHER PUBLICATIONS

Cindrich, "Image Scanning by Rotation of a Hologram," Applied Optics, vol. 6, No. 9, Sep. 1967, pp. 1531-1534.
Bardos et al., "Gigabit/Second Recording with Holography," Proceedings of Tech. Program: Electro-Optical Systs. Design Conf., New York, Sep. 18-20, 1973, pp. 90-101.
Sincerbox, "Formation of Optical Elements by Holography," IBM Tech. Discl. Bull., vol. 10, No. 3, Aug. 1967, pp. 267-268.
Lit et al., "Focal Depth of a Transmitting Axicon," Journal of the OSA, vol. 63, No. 4, Apr. 1973, pp. 445-449.
Richter et al., "Holographically Generated Lens," Applied Optics, vol. 13, No. 12, Dec. 1974, pp. 2924-2930.

Primary Examiner—John K. Corbin
Assistant Examiner—John D. Lee
Attorney, Agent, or Firm—Klarquist, Sparkman, Campbell, Leigh, Hall & Whinston

[57] ABSTRACT

Holographic lenses are formed on a substantially transparent scanning disc wherein a line focus is the object for each hologram. Such hologram is then used to reconstruct the line focus at the location of the record to be scanned, thereby alleviating tolerance requirements in regard to the positioning or flatness of the scanned record.

9 Claims, 7 Drawing Figures

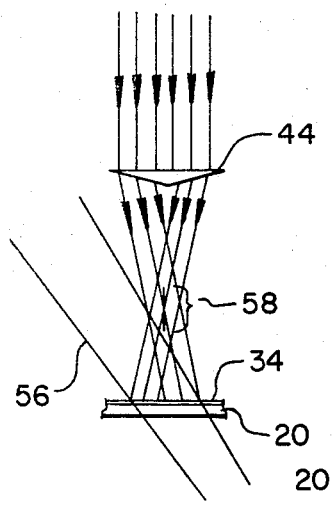
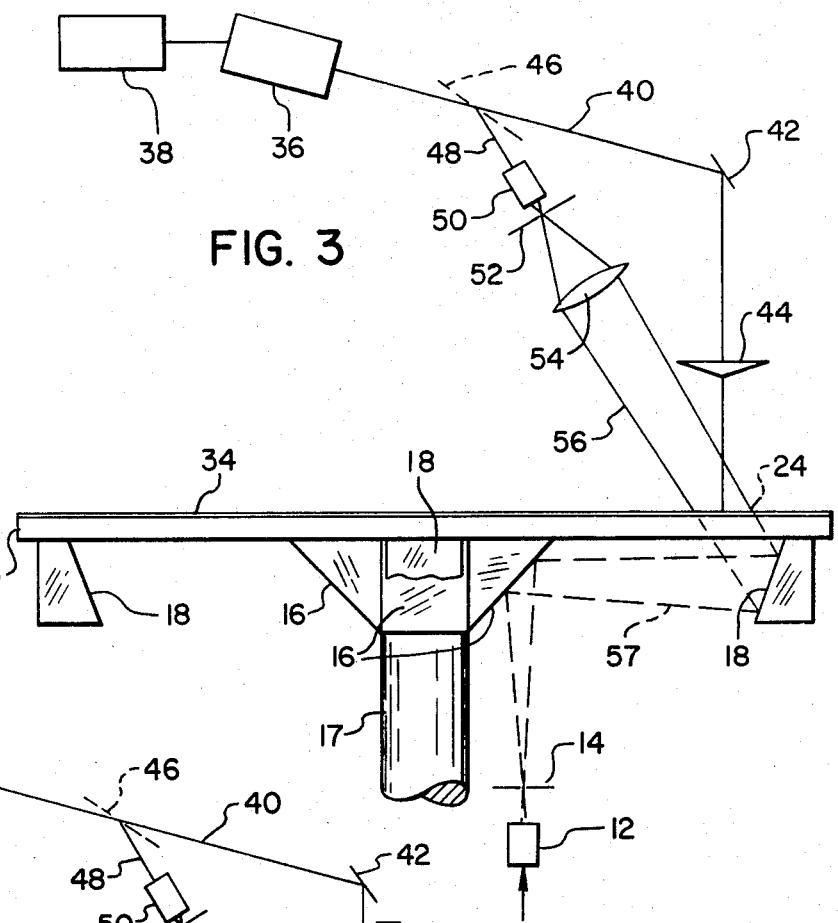
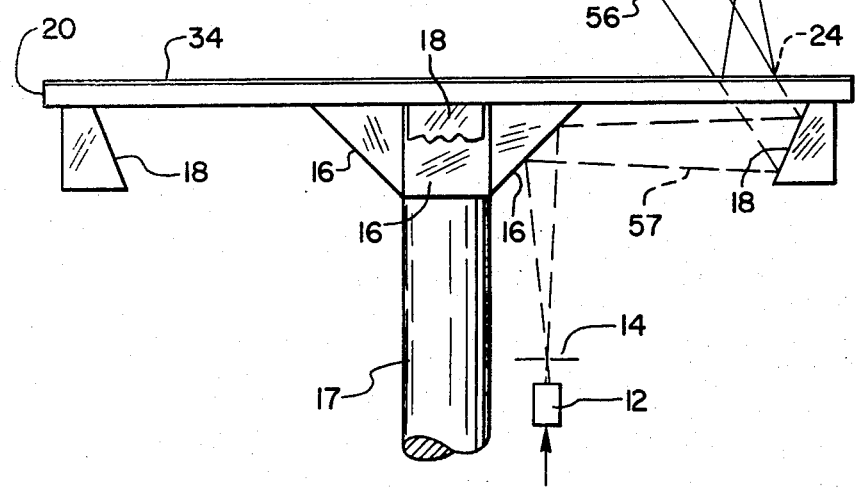

METHOD OF MANUFACTURING AND UTILIZING HOLOGRAPHIC LENS MEANS

BACKGROUND OF THE INVENTION

The present invention relates to a method of manufacturing lenses and particularly to such a method for producing lenses having an increased depth of focus.

A system for storage and retrieval of information at extremely high densities is described and claimed in U.S. Pat. No. 3,501,586 granted to James T. Russell on Mar. 17, 1970, entitled "Analog to Digital to Optical Photographic Recording and Playback System" and assigned to the assignee of the present invention. In such a system a single pulsed light source is focused to an extremely small focal spot which is optically scanned over a sensitive medium for either the recording or playback of information. Audio or video information can be recorded through the conversion of the analog information to digital information used to modulate the light source whereby the record appears as a multiplicity of digit-representing spots arranged on the medium with high packing density. The positioning of optical elements and the sensitive medium tends to be critical for making sure the record is not blurred or out of focus. A small spot size for a lens or the like ordinarily implies a short depth of focus so that the recording medium must be accurately situated and substantially flat to prevent the blurring or overlapping of the recorded information.

In a particular instance, information may be recorded with a scanning disc which is rotated past a photosensitive plate, wherein relative linear movement is also provided between the scanning disc and the photosensitive plate. A plurality of microscope objectives are positioned upon the scanning disc, each one in turn receiving a beam of light and tracing an arcuate path across the face of the photosensitive plate whereby paths of digital spots may be recorded on such plate. As will be appreciated by those skilled in the art, the depth of focus of the microscope objectives is such that the spacing between the scanning disc and the photosensitive plate must be accurately predetermined.

Holographic lens means have also been employed for scanning a beam of light over a record, such as for recording or playing back information on a photosensitive film or the like. The holographic lens means can be rotated in a scanner for describing the path of a light beam across the recording element. Each such holographic lens means is suitably formed in the same manner as any other hologram by directing a coherent object beam and reference beam toward the location where the lens is to be formed, i.e., upon a photosensitive scanning element or disc. The scanning element is developed to reproduce the interference pattern of said object beam and reference beam and is then capable of optically reconstructing the "object" from which the hologram was formed. In the case of the conventional holographic lens, the "object" would suitably comprise a point source whereby the resulting hologram will reconstruct the point source at a given focal length for scanning a record. However, as in the case of a scanner employing microscope objectives for reading or recording spots, the scanner employing holographic lens means will also be subject to close tolerance requirements on positioning and flatness of the record to prevent an out-of-focus or blurred record, or alternatively, inability to read the record with accuracy.

SUMMARY OF THE INVENTION

According to the present invention, an improved lens means suitable for scanning purposes is manufactured by generating an object beam and a reference beam characterized by mutually coherent radiation, directing the object beam and reference beam at an angle to one another to expose a layer of photosensitive material for generating an interference pattern or hologram in the photosensitive material, directing the object beam to provide an elongated focus as the object for generating the interference pattern or hologram, and developing the photosensitive material to reproduce the interference pattern or hologram of the object beam and reference beam. In a particular embodiment, a holographic lens means is generated by employing an axicon image, provided by an axicon lens, as the object for the hologram. According to another embodiment, the hologram is formed by moving an object, comprising a light focus, between successive exposures to provide a multi-focus hologram, while according to yet another embodiment, a lens for providing the object comprises a lens with spherical aberration. In any case, the elongated focus utilized as the object for the hologram enables the hologram thus formed to reconstruct the elongated focus in the vicinity of a recording medium. Such a holographic lens means mounted upon a scanner can provide an elongated focus for intersecting a recording medium whereby a digital spot of substantially a given size may be either recorded or read out so long as the recording medium is placed somewhere along the elongated focus reproduced by the holographic lens means. Therefore, manufacturing tolerances upon the scanner, the record, and the means for holding the scanner and the record in accurate juxtaposition need not be as stringent as in the case of the usual scanning lens means. The record itself need not be perfectly flat but may even be slightly warped without causing blurring in the recording of information or indistinctness in the readout thereof.

It is accordingly an object of the present invention to provide an improved method of recording and reading out an optically recorded record having a high recording density.

It is another object of the present invention to provide an improved optically recorded record of high recording density.

It is another object of the present invention to provide an improved method of recording and reading out digital information having high packing density.

It is a further object of the present invention to provide an improved method of recording and reading out optically recorded information which allows for less stringent tolerance requirement in the dimensioning and spacing of the apparatus and recording medium.

It is a further object of the present invention to provide an improved method of recording and reading out optically recorded information wherein the flatness of the recording medium is not critical.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a perspective view, partially broken away, of a scanning system employed for digital recording, FIG. 2 is a side view, partially broken away, of the FIG. 1 system, particularly illustrating means for reading back recorded data, FIG. 3 is a side view, partially broken away, of a scanning system illustrating a method according to a first embodiment of the present invention for forming holographic lens means on the scanner disc, FIG. 4 illustrates in greater detail the operation of an axicon lens employed in the FIG. 3 embodiment, FIG. 5 is a side view, partially broken away of a scanning system illustrating a method according to a second embodiment of the present invention for forming a holographic lens on a scanner disc.

FIG. 6 is a side view, partially broken away, of a scanner system illustrating a method according to another embodiment of the present invention for forming a holographic lens on a scanner disc, and FIG. 7 is a side view, partially broken away, of a scanner system illustrating a method according to yet a further embodiment of the present invention for forming a holographic lens on a scanner disc.

DETAILED DESCRIPTION

Figure 1:
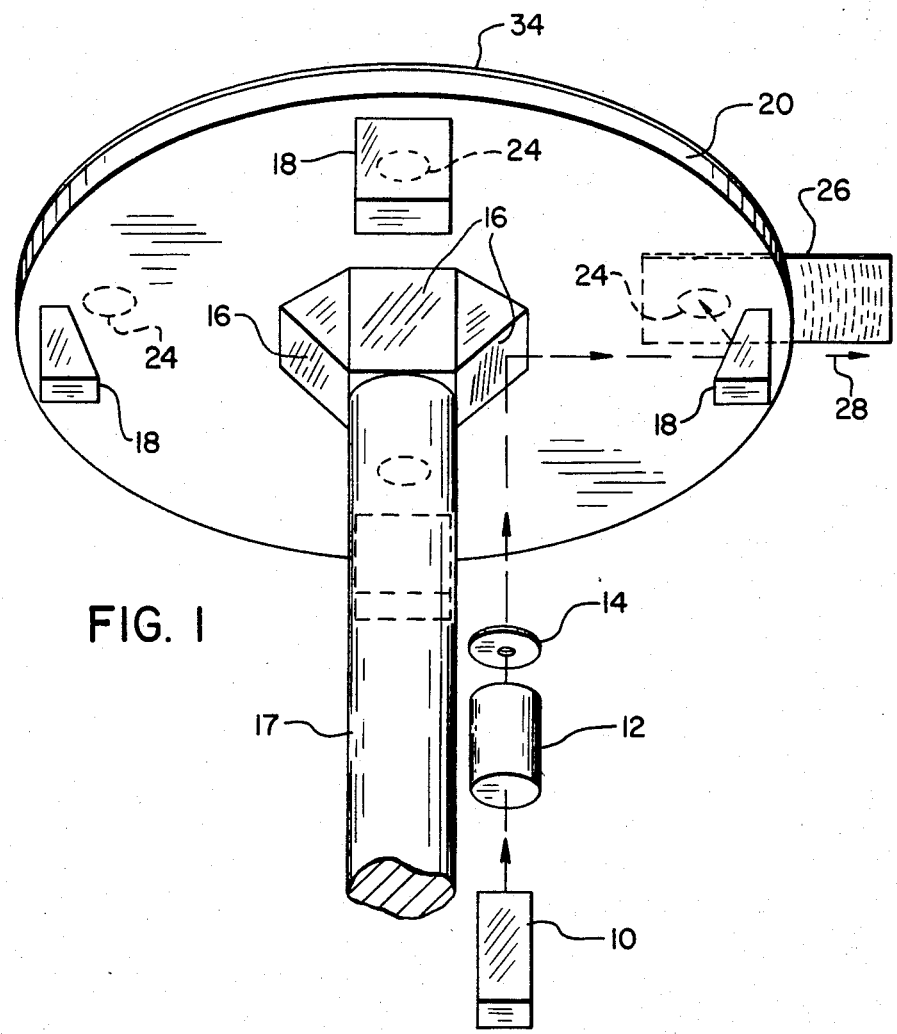
Figure 2:
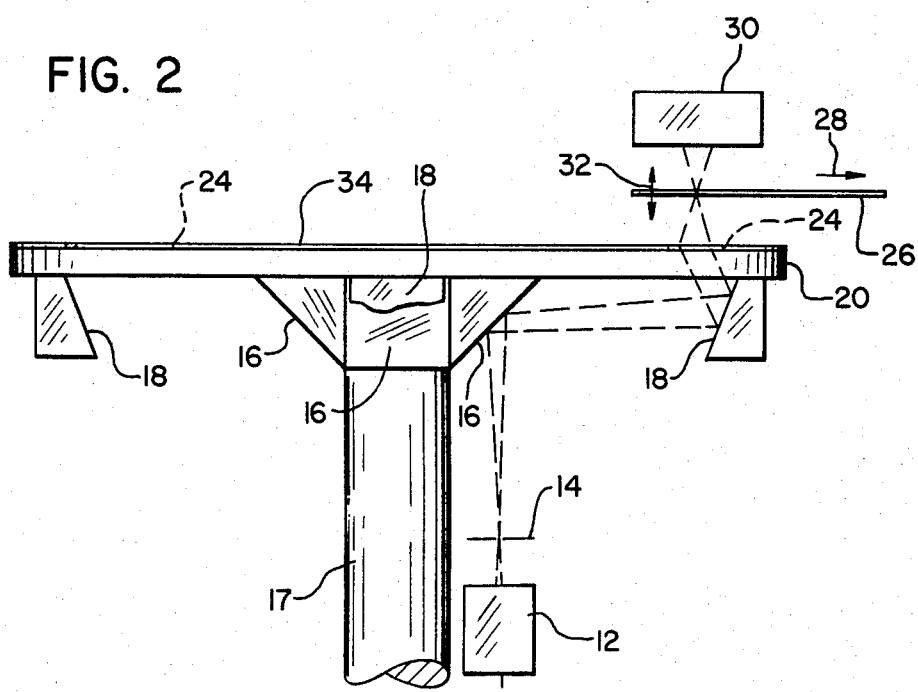

Referring to FIGS. 1 and 2, a signal recording and playback system is shown, by means of which a signal may be recorded as a plurality of digital "spots" with extremely high recording density. As described in the aforementioned U.S. Pat. No. 3,501,586, an analog signal is first converted to a digital signal utilizing analog to digital converter means. Referring to FIG. 1, the resulting digital signal may be employed to modulate laser 10 (by means not shown) causing the laser to transmit an intermittent beam of light through microscope objective 12 and pinhole disc 14 to one mirror of a series of 45° angle mirrors 16 mounted on rotating shaft 17 next to a disc 20. The disc 20 is also attached to the shaft 17 for rotation therewith. The beam is directed by a mirror 16 to a second mirror 18 mounted on the underside of disc 20 near its periphery for redirecting the light beam "through" the disc 20. The disc 20 is suitably transparent and includes a plurality of lens means 24 which receive the light beam and direct the same onto a photographically sensitive record 26. As the light beam is modulated, the disc 20 is rotated and record 26 is moved in the direction of arrow 28 whereby successive light beam paths intersect the record 26 causing photographic exposure thereof and recording of a plurality of very small "spots" in arcuate tracks indicative of the applied digital signal. Each mirror combination, 16, 18, in turn intercepts the laser beam of light so that each lens means 24 in turn catches the light beam for directing the same upon the record 26.

To read out the recorded information from a developed record, the same optical system may be employed, with the addition of a photocell 30 positioned above the rotating disc 20. The light beam scans along the arcuate paths of digitally recorded information on record 26 and photocell 30 responds thereto for reading out the digital information. This digital information may then be converted to analog form as described in the aforementoned patent.

The manufacture and placement of lens means 24 for properly scanning the recorded information can be difficult since the recorded information is very closely packed and therefore alignment and focusing are critical. The depth of focus of a lens or lens system for producing very small spots is rather short, thus placing restrictions upon the flatness and allowable vertical movement of record 26, in the direction of arrow 32 in FIG. 2.

In accordance with the present invention, the lens means 24 in FIGS. 1 and 2 are formed in place as holographic lenses, suitably employing in part the same optical system subsequently utilized for recording and-/or reading out information on record 26. The disc 20, which may be formed of glass, or transparent plastic, is provided with a layer 34 of photosensitive material, suitably on top of disc 20, and this photosensitive material is exposed and developed for providing the holographic lens means. Alternatively disc 20 is opaque material such as ceramic or metal with photosensitive inserts located where the holographic lenses are to be formed. In another variation the photosensitive inserts would be separately exposed in a fixed jig, processed, and inserted in disc 20. This does not provide for the location precision inherent in making the holographic lenses in place, but it does provide a greater depth of focus at lower cost as compared to a standard lens.

Typical examples of appropriate photosensitive materials are silver based materials including Kodak 120-02 holographic plate comprising a glass plate with 120-02 emulsion thereon indicated at 34 in the drawing developed in D-19 Kodak developer and bleached with $FeCl_3$. Agfa 10E75 material is also suitable. Alternatively a Shipley photoresist AZ1350 developed in a 4:1 solution of water and AZ303 developer may be employed. The photoresist is suitably coated onto a glass plate and an argon laser is used for exposure. Another alternative comprises dichromated gelatin prepared by removing the silver from Kodak 649F plates and then dichromating. Exposure to light induces cross-linking of the ammonium dichromate molecules. When the plate is then soaked in water, the emulsion swells in proportion to the degree of cross-linking and the resulting strains in the emulsion upon rapid dehydration in alcohol produces cracking. Thus, such a hologram is made up of a medium with microscopic voids providing distinct index of refraction variations. Again, an argon laser is employed for exposure.

The silver based material and in particular the Kodak 120-02 is preferred. An example of the photographic process for using this material is given as follows:

a. Adjust the ratio between reference beam and object beam (as hereinafter described) to 1:1.

b. Expose to about 50–150 microjoules/$CM^2$, as determined by a light meter.

c. Develop in Kodak D-19 developer for 5 minutes.

d. Employ a stop-bath for 30 seconds, such stop-bath being available from Kodak or comprising dilute acetic acid or water.

e. Fix for 5 minutes.

f. Wash for 5 minutes.

g. Bleach in $FeCl_3$ for 10 minutes.

h. Wash for 5 minutes.

i. Clear in a solution of $KMnO_4$ and KBr (as hereinafter described) for 5 minutes.

j. Wash for 10 minutes.

k. Rinse in a 7/1 ratio of water and methyl alcohol for 1 minute.

l. Wash in isopropyl alcohol for 2 minutes.

m. Dry at ambient.

The bleach for step g above is prepared as follows:

1. Dissolve 25 grams of $FeCl_3$ in 500 ml. of distilled water.
2. Add and dissolve 25 grams of $CuBr_2$.
3. Carefully add 10 ml. of concentrated $H_2SO_4$ while stirring slowly.
4. If the color of the solution is a brilliant emerald green, add distilled water to make 1 liter of solution. If the color is not right, add up to 10 ml. more of concentrated $H_2SO_4$ and then add the distilled water.
5. Filter the solution.
6. Discard the bleach solution following its use.

The clearing bath as utilized in step i above is prepared as follows:

Just before use, add 1 part of solution I to 10 parts of solution II and discard after use.

SOLUTION I:

Dissolve 5 grams of potassium permanganate ($KMnO_4$) in 1 liter of distilled water.

SOLUTION II:

1. Dissolve 50 grams of potassium bromide (KBr) in 500 ml. of distilled water.
2. Carefully add 10 ml. of concentrated $H_2SO_4$.
3. Add distilled water to make 1 liter of solution.

The manner of exposure in step b of the plate (disc 20) is further illustrated in FIGS. 3 and 4. A pulsed laser 36 controlled by controller 38 provides a beam 40 in the form of an impulse of short duration which is reflected by mirror 42 through an axicon lens 44 to layer 34 on transparent disc 20 at the location of the desired lens. The beam 40 is intercepted by the half silvered mirror 46 to provide a second beam 48 directed through microscope objective 50 and pinhole diaphragm 52 to a lens 54. Lens 54 forms a converging beam 56 impinging upon layer 34 in the vicinity of the desired lens means and coincident with the illumination supplied via beam 40. The beam 56 is the conjugate of the "reconstruction" beam 57 as will be supplied via mirror 18 in the subsequent recording and reproducing of digital information.

Referring to FIG. 4, the action of axicon lens 44 is shown in greater detail. The axicon, discussed by John H. McLeod in the Journal of the Optical Society of America, Volume 44, pages 592–597, has the property of producing an axicon image or line focus in the direction of the beam, i.e., perpendicular to the layer 34 in this case. This image is illustrated at 58 in FIG. 4. The axicon image then becomes the object for producing a hologram in layer 34.

The method of producing any hologram is interferometric and requires coherent light from the laser or the like. In this case, the beam from laser 36 is divided into separate paths which are then angularly directed toward layer 34. Beam 56 comprises the "reference" beam, while the "object" beam is supplied via axicon lens 44. The result is an interference pattern, called a hologram, produced in layer 34, which can be used in reproducing the "object", such object in this case being a line focus or axicon image.

After the hologram has been developed, "reconstruction" beam 57 will reform such axicon image or line focus 58 at its original position. Consequently, the axicon image 58 is originally formed by lens 44 at a location such that its reproduction will intersect plate 26 in FIG. 1, i.e., such that plate 26 would substantially bisect the axicon image. It will be seen the holographic lens has a large "depth of focus" for recording and reading out the digital "spots" of the record on plate 26. Thus, plate 26 can move in a vertical direction as indicated by arrow 32 in FIG. 2, or can have an error in flatness, without causing the digitally recorded information to be blurred or out of focus since the spots are recorded and read out by a light line intersecting the record rather than by a spreading beam. The process of forming the holographic lens is suitably repeated for each lens means 24 desired. It is understood the optical system as illustrated above disc 20 is utilized only for formation of the lens means, and not during recording or readout of digital data.

A second embodiment of the present invention is illustrated in FIG. 5 wherein a microscope objective 60 and pinhole apertured disc 62 are movable as a unit by means of motor screw drive 64. The microscope objective receives beam 40 and the disc 62 is positioned near the location which will be subsequently occupied by plate 26 in FIG. 2. The positioning in FIG. 5 is schematic for clarity of illustration, and it is understood the pinhole will frequently be located much closer to layer 34 than shown. In the instance of the FIG. 5 embodiment, the hologram formed in layer 34 is capable of reproducing the pinhole aperture in disc 62 as when reconstruction beam 57 is directed through the developed hologram. During initial recording of the hologram, the combination of microscope objective 60 and aperture disc 62 is moved slightly in a vertical direction with drive 64 between successive exposures made by pulsation of laser 36. The successive exposures take place with the pinhole apertured disc 62 located along a range of possible positions in the vertical direction as might be occupied by plate 26. As a result, the "reconstruction" beam 57 as subsequently employed will establish a "lumpy" line focus comprising a number of closely spaced spots displaced in the vertical direction. Since playback electronics for the digital recording can be made to respond primarily to fast transitions, the small lumps will not cause difficulty in reading out the record despite diffuse light levels. During recording, the threshold of the photosensitive material results in an exposure for the focused lump, while diffused light produces no response.

Figure 6:
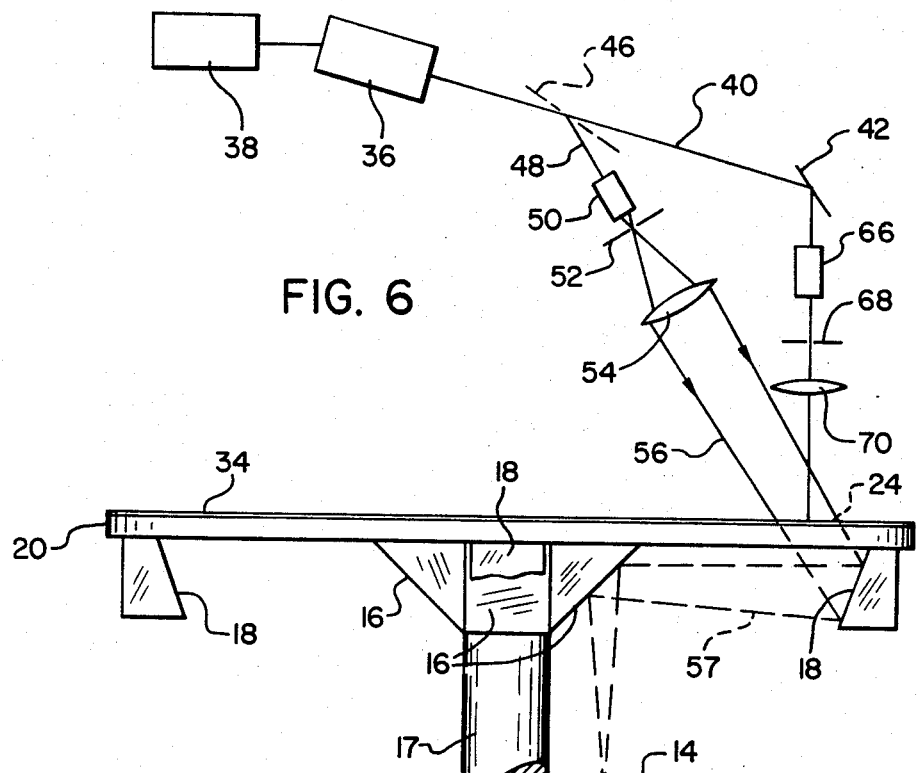

A further embodiment of the invention is illustrated in FIG. 6. In this instance, beam 40 is directed by mirror 42 through microscope objective 66, pinhole disc 68 and lens 70, in that order, for impinging upon layer 34 concurrently with reference beam 56. Lens 70 is designed to have spherical aberration, and although the beam 40 passes through pinhole disc 68, the lens 70 does not image the pinhole but rather provides a line focus suitably at the location which will be subsequently occupied by plate 26. This line focus is used as the "object" for the holographic lens as hereinbefore described, whereby "reconstruction" beam 57 will be able to reproduce the line focus for recording and reading out information relative to plate 26.

Figure 7:
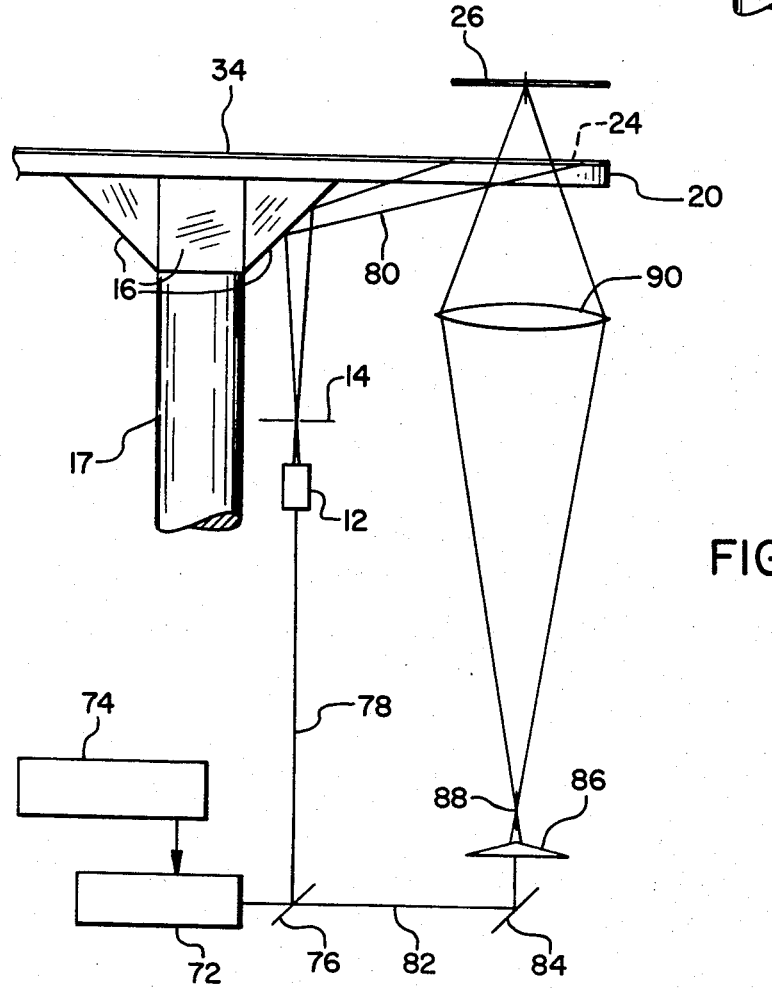

A further embodiment of the invention is illustrated in FIG. 7. In this instance, the same laser 72 and control 74 are employed for formation of holographic lenses as is subsequently employed in recording and reading out of data on plate 26. The beam from laser 72 passes through half silvered mirror 76 which directs a beam 78 through microscope objective 12 and pinhole disc 14 for supplying beam 80 which in this instance is utilized both as a reference beam and a reconstruction beam. The non-reflected portion 82 of the beam from the laser is directed to mirror 84 which reflects the same through axicon lens 86 for establishing an axicon or line image at location 88. Lens 90 which is good, diffraction limited lens, images the axicon image at the location to be occupied by plate 26. Notice lens 90 forms a converging beam in the direction of layer 34 to form the hologram. The embodiment of FIG. 7 has the advantage of utilizing the same optical system for forming the lens means 24 as is subsequently used in recording and reading out information on plate 26. Under these circumstances, in spite of fixed errors in machining or location of components, the beam 80 utilized as a reconstruction beam will reform the line focus at accurately predetermined locations initially determined when the lens means is formed. That is, since the holographic lenses are formed in place using the same optical train as used in recording or readout, the optics will be correctly positioned for accurate tracking of information in spite of fixed errors in the mechanical construction of the system. While the embodiment of FIG. 7 is illustrated as utilizing an axicon lens 86 to provide a line focus, it is understood the alternative construction of FIG. 6 utilizing a lens with spherical aberration, or the construction of FIG. 5 for providing a "lumpy" line focus, may be substituted therefor. It is also understood axicon lens 86 or any substitute therefor together with elements 84 and 90 are used only for the formation of the lens means and are not used during recording or reading of information from plate 26. Similarly, plate 26 is absent during the formation of lens means.

While we have shown and described several embodiments of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

1. The method of recording and reading out information on a sensitive plate means comprising:

forming a holographic lens on a rotatable member provided with photosensitive material including generating an object beam and a reference beam characterized by mutually coherent radiation, directing said object beam and said reference beam at an angle to one another to expose the photosensitive material on said member for generating an interference pattern in said photosensitive material, directing said object beam to provide an elongated focus as the object for generating said interference pattern, developing said photosensitive material to provide a holographic lens, and rotating said member and re-exposing said photosensitive material to provide further holographic lenses, locating said sensitive plate means adjacent said holographic lenses of said rotatable member, rotating said member and consecutively directing a reconstruction beam through said holographic lenses to said plate means to reproduce said elongated focus at said plate means, and providing relative movement between said member and said plate means for tracing light paths on said plate means with said elongated focus.

2. The method according to claim 1 wherein said reconstruction beam is modulated to form a digital recording on said plate means.

3. The method according to claim 1 including detecting light passing through said plate means from said reconstruction beam for detecting information recorded on said plate means.

4. The method according to claim 1 wherein said object beam and said reference beam are directed toward said member from a first side thereof, while said reconstruction beam is directed toward said member from a second side thereof, said reconstruction beam being the conjugate of said reference beam.

5. The method according to claim 1 wherein said reference beam, said object beam and said reconstruction beam are directed toward said member from the same side thereof, said reconstruction beam being formed substantially identically as said reference beam via the same optical path for assuring accurate tracking of information on said plate means.

6. The method according to claim 1 wherein said object beam is refracted to provide an axicon image as said elongated focus to form the object for generating said interference pattern.

7. The method according to claim 6 wherein said object beam is refracted by an axicon lens to provide said axicon image.

8. The method according to claim 1 wherein said elongated focus is generated by focusing said object beam substantially to a point as an object along said object beam, exposing said photosensitive material, moving the point focus to other positions along said object beam and successively exposing the layer of photosensitive material thereto.

9. The method according to claim 1 wherein said object beam is refracted by a lens with spherical aberration to provide said elongated focus to form the object for generating said interference pattern.

* * * * *